(12) United States Patent
Crews et al.

(10) Patent No.: US 9,029,299 B2
(45) Date of Patent: *May 12, 2015

(54) METHODS AND COMPOSITIONS FOR DELAYED RELEASE OF CHEMICALS AND PARTICLES

(75) Inventors: James B. Crews, Willis, TX (US); Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 969 days.

This patent is subject to a terminal disclaimer.

(21) Appl. No.: 12/404,723

(22) Filed: Mar. 16, 2009

(65) Prior Publication Data

US 2009/0192053 A1     Jul. 30, 2009

Related U.S. Application Data

(63) Continuation-in-part of application No. 11/755,581, filed on May 30, 2007, now Pat. No. 7,550,413, and a continuation-in-part of application No. 11/679,018, filed on Feb. 26, 2007, now Pat. No. 7,723,272, and a continuation-in-part of application No. 11/125,465, filed on May 10, 2005, now Pat. No. 7,343,972.

(60) Provisional application No. 61/037,179, filed on Mar. 17, 2008, provisional application No. 60/815,693, filed on Jun. 22, 2006, provisional application No. 60/570,601, filed on May 13, 2004.

(51) Int. Cl.
C09K 8/60      (2006.01)
C09K 8/584     (2006.01)
C09K 8/516     (2006.01)
C09K 8/536     (2006.01)
C09K 8/68      (2006.01)

(52) U.S. Cl.
CPC .............. *C09K 8/602* (2013.01); *C09K 8/584* (2013.01); *C09K 8/516* (2013.01); *C09K 8/536* (2013.01); *C09K 8/68* (2013.01); *C09K 2208/30* (2013.01)

(58) Field of Classification Search
None
See application file for complete search history.

(56) References Cited

U.S. PATENT DOCUMENTS 5,258,137 A * 11/1993 Bonekamp et al. ............. 516/11
5,964,295 A * 10/1999 Brown et al. ............... 166/308.2
5,979,557 A * 11/1999 Card et al. ..................... 166/300
6,022,494 A    2/2000 Sartori et al.
6,194,356 B1 * 2/2001 Jones et al. .................... 507/225

(Continued)

OTHER PUBLICATIONS

J. B. Crews, et al., "Internal Phase Breaker Technology for Viscoelastic Surfactant Gelled Fluids," SPE 93449, 2005 SPE International Symposium on Oilfield Chemistry, Feb. 2-4, 2005.

(Continued)

*Primary Examiner* — John J Figueroa
(74) *Attorney, Agent, or Firm* — Mossman Kumar & Tyler PC

(57) ABSTRACT

Agents, chemicals and particles may be controllably released at remote locations, such as pre-selected or predetermined portions of subterranean formations, by binding or associating or trapping them with an association of micelles formed by a viscoelastic surfactant (VES) in an aqueous base fluid to increase the viscosity of the fluid. An internal breaker within the association of micelles disturbs the association of micelles at some later, predictable or predetermined time thereby reducing the viscosity of the aqueous viscoelastic treating fluid and releasing the agent, chemical or particle at a predetermined or selected location.

13 Claims, 3 Drawing Sheets

(56) References Cited

U.S. PATENT DOCUMENTS

| | | | |
|---|---|---|---|
| 6,613,720 B1* | 9/2003 | Feraud et al. | 507/200 |
| 7,066,260 B2 | 6/2006 | Sullivan et al. | |
| 7,081,439 B2* | 7/2006 | Sullivan et al. | 507/269 |
| 7,084,095 B2 | 8/2006 | Lee et al. | |
| 7,265,079 B2* | 9/2007 | Willberg et al. | 507/203 |
| 7,550,413 B2 | 6/2009 | Huang et al. | |
| 2002/0004464 A1* | 1/2002 | Nelson et al. | 507/200 |
| 2002/0076803 A1* | 6/2002 | Crews | 435/266 |
| 2002/0193257 A1* | 12/2002 | Lee et al. | 507/200 |
| 2003/0092581 A1* | 5/2003 | Crews | 507/100 |
| 2003/0106690 A1* | 6/2003 | Boney et al. | 166/280 |
| 2003/0234103 A1 | 12/2003 | Lee et al. | |
| 2004/0106525 A1* | 6/2004 | Willberg et al. | 507/200 |
| 2004/0209780 A1* | 10/2004 | Harris et al. | 507/117 |
| 2006/0105919 A1* | 5/2006 | Colaco et al. | 507/209 |
| 2006/0180308 A1* | 8/2006 | Welton et al. | 166/282 |
| 2006/0180309 A1* | 8/2006 | Welton et al. | 166/282 |
| 2006/0180310 A1* | 8/2006 | Welton et al. | 166/283 |
| 2007/0056737 A1* | 3/2007 | Crews et al. | 166/300 |
| 2008/0202744 A1* | 8/2008 | Crews et al. | 166/246 |

OTHER PUBLICATIONS

J.B. Crews, et al., "New Fluid Technology Improves Performance and Provides a Method to Treat High Pressure and Deepwater Wells," SPE 103118, 2006 SPE Annual Technical Conference and Exhibition, Sep. 24-27, 2006.

* cited by examiner

METHODS AND COMPOSITIONS FOR DELAYED RELEASE OF CHEMICALS AND PARTICLES

CROSS-REFERENCES TO RELATED APPLICATIONS

This application claims the benefit of U.S. Provisional Patent Application No. 61/037,179 filed on Mar. 17, 2008, and is a continuation-in part of U.S. patent application Ser. No. 11/679,018 filed on Feb. 26, 2007, issued May 25, 2010 as U.S. Pat. No. 7,723,272, and is a continuation-in part of U.S. patent application Ser. No. 11/755,581 filed on May 30, 2007, issued Jun. 23, 2009 as U.S. Pat. No. 7,550,413, which in turn claims the benefit of U.S. Provisional Patent Application No. 60/815,693 filed on Jun. 22, 2006, and is a continuation-in part of U.S. patent application Ser. No. 11/125,465, filed on May 10, 2005, issued Mar. 18, 2008 as U.S. Pat. No. 7,343,972, which in turn claims the benefit of U.S. Provisional Patent Application No. 60/570,601 filed May 13, 2004.

TECHNICAL FIELD

The present invention relates to aqueous, viscoelastic fluids used during hydrocarbon treatment operations, and more particularly relates, in one non-limiting embodiment, to methods and compositions for delayed delivery of particles, chemicals and other agents at remote locations such as downhole to a subterranean reservoir.

BACKGROUND

Hydrocarbons such as oil, natural gas, etc., may be obtained from a subterranean geologic formation, e.g., a reservoir, by drilling a well that penetrates the hydrocarbon-bearing formation. This provides a partial flowpath for the hydrocarbons to reach the surface. In order for oil to be produced, that is travel from the formation to the well bore (and ultimately to the surface), there must be a sufficiently unimpeded flowpath from the formation to the well bore. Unobstructed flow through the formation rock (e.g., sandstone, carbonates) is possible when rock pores of sufficient size and number are present for the oil to move through the formation.

However, as is becoming more generally known, greater effort and varied approaches must be undertaken to produce hydrocarbons since the relatively easier to produce subterranean formations have generally been found. Thus, the oil and gas industry is looking at producing hydrocarbons from subterranean formations where recovering the hydrocarbons is more difficult and requires many steps, including the introduction and placement of various components, additives and agents at relatively precise locations downhole.

One such more complicated process involves hydraulically fracturing the subterranean formation—literally breaking or fracturing a portion of the strata surrounding the wellbore. The development of suitable fracturing fluids to provide the necessary hydraulic force is a complex art because the fluids must simultaneously meet a number of conditions. For example, they must be stable at high temperatures and/or high pump rates and high shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations.

Aqueous fluids gelled with viscoelastic surfactants (VESs) are also known in the art. VES-gelled fluids have been widely used as gravel-packing, frac-packing and fracturing fluids because they exhibit excellent rheological properties and are less damaging to producing formations than crosslinked polymer fluids. VES fluids are non-cake-building fluids, and thus leave no potentially damaging polymer cake residue. However, the same property that makes VES fluids less damaging tends to result in significantly higher fluid leakage into the reservoir matrix, which reduces the efficiency of the fluid especially during VES fracturing treatments. It would thus be very desirable and important to discover and use fluid loss agents for VES fracturing treatments in high permeability formations.

Many techniques and compositions are known to introduce chemicals, particles and other agents on a delayed release downhole, not only for purposes of fracturing, but for other reasons, including, but not limited to reducing fluid loss (as mentioned), breaking the gelled fluid, inhibiting scale, inhibiting corrosion, inhibiting hydrate formation, stimulation treatments (e.g. with acids), for cementing, for remedial purposes, etc. Various methods of keeping the chemical, particle or other agent in a form that is ineffective or preserved until delivery or release at the proper locations downhole include microencapsulation, macroencapsulation, incorporation within an emulsion or multiple emulsion, and the like. It would be desirable if other techniques besides these could be devised to provide an alternative or improved downhole delayed agent delivery system.

SUMMARY

There is provided, in one form, a method for delayed treating of a subterranean formation with an agent that involves injecting an aqueous viscoelastic surfactant treating fluid through a wellbore to the subterranean formation, particularly at a predetermined location, in non-limiting examples, in a fracture or at a particular zone. The aqueous viscoelastic treating fluid may include, but is not necessarily limited to, an aqueous base fluid, a viscoelastic surfactant (VES) gelling agent present in an amount effective to form an association of micelles that increases the viscosity of the aqueous viscoelastic surfactant treating fluid, one or more internal breakers within the association of micelles, and the agent within the association of micelles. The method further involves breaking the association of micelles with the internal breakers to reduce the viscosity of the aqueous viscoelastic surfactant treating fluid and to deliver the agent at the predetermined location, and thus contact and/or treat the subterranean formation.

There is further provided in another non-limiting embodiment an aqueous viscoelastic treating fluid that includes an aqueous base fluid, a VES gelling agent in an amount effective to form an association of micelles that increases the viscosity of the aqueous viscoelastic surfactant treating fluid, at least one internal breaker within the association of micelles, and an agent within the association of micelles. The agent may include, but is not necessarily limited to, fluid loss control agents, bacteria, bacteria nutrients, biocides, enzyme polymer breakers, oxidative polymer breakers, microencapsulated chemicals, macroencapsulated chemicals, nanoencapsulated chemicals, scale inhibitors, gas hydrate inhibitors, corrosion inhibitors, stimulation chemicals, remedial cleanup agents, water-block removal agents, scale removal agents, fine migration control agents, and combinations thereof. The aqueous viscoelastic surfactant treating fluid may also include a temperature stabilizer and/or a viscosity stabilizer.

In particular, in the case of the fluid loss control agents (e.g. MgO and/or $Mg(OH)_2$, and the like), these appear to help develop a pseudo-filter cake of VES micelles by associating with them as well as ions and particles (in one non-restrictive explanation) to produce a novel and unusual viscous fluid layer of pseudo-crosslinked elongated micelles on the wellbore and/or reservoir face that limits further VES fluid leak-off for controlling the depth of treatment fluid penetration and/or as a means to better direct and target the placement location of the treating fluid with the select agent or agents to be released. Additionally, the art may be further advanced by use of nanometer-sized fluid loss control agents that also form a similar viscous fluid layer of pseudo-crosslinked micelles on the wellbore and/or formation face that are equivalent to micron-sized fluid loss control agents herein in controlling rate of VES fluid loss and placement location of the treatment fluid, yet can be non-pore plugging and physically easier to produce back with the VES fluid after a VES treatment. That is, the effectiveness of the method is largely independent of the size of the fluid loss control agents. The use of MgO for fluid loss control also has utility over a broad range of temperature of about 70° F. to about 400° F. (about 21° C. to about 204° C.).

Figure 1:
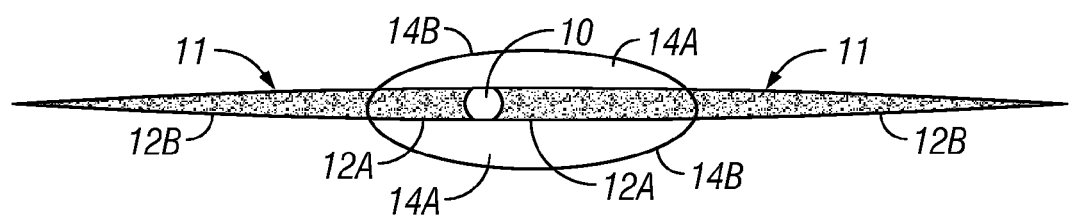
FIG. 1 is a schematic illustration of a top view of a wellbore and a hydraulic fracture.

It will be appreciated that the Figures are schematic illustrations which are not to scale, and that not all features are in proper proportion to more clearly illustrate certain features.

DETAILED DESCRIPTION

Methods and chemical compositions have been discovered for altering the properties of viscoelastic surfactants (VESs) in aqueous fluids. It has been further surprisingly found that this technology may be applied toward controlled, targeted release of particles, chemicals and other agents over time, either relatively spontaneously or over a relatively long term, when placed in the wellbore or downhole in a subterranean reservoir.

A specific method is primarily the temporary trapping or holding of particular agents (e.g. liquid chemicals or solid chemicals and other particles) within a VES fluid matrix and the delayed release of the particular agents once or after a certain duration of time downhole by activation of internal breaking agents that degrade the VES micelles structure and fluid viscosity. The specific chemical properties to be considered in designing the delayed and controlled release of a particular agent at a particular time and location include, but are not necessarily limited to:

1. Appropriate viscosity to incorporate and temporarily trap the agent to be released.
2. Appropriate type and amount of an internal breaker or internal breakers.
3. The presence and proportion of a temperature stabilizer.
4. The presence and proportion of a viscosity stabilizer.
5. The presence and proportion of a VES micelle associating fluid loss control agent or agents.

By "delayed release" is meant the release of the agent (e.g. chemical, particle, etc.) in a form and amount that is effective for their stated purpose. That is, the agent is no longer prevented from being effective or active by being present in an association of micelles that impart increased viscosity to the aqueous base fluid. These agents are temporarily prevented or inhibited from being effective, or at least substantially effective, by the presence and unique properties of the association of elongated micelles in which they are present.

Liquids gelled with polymers form polymeric filter cakes on and within the formation which can result in damage to the formation when the polymeric filter cakes are incompletely or only partially removed prior to hydrocarbon production. This damage may result in reduced production of hydrocarbons. In contrast, viscoelastic type surfactants generate viscosity in aqueous fluids by forming unique elongated micelle arrangements. These unique arrangements have often been referred to as worm-like or rod-like micelles structures. The increase in viscosity is believed due to the entanglement of the worm-like or elongated micelles. Further, it is this interaction, entanglement or association of micelles that carries the agent and keeps the agent from becoming active prematurely, in one non-limiting explanation herein. Additionally, VES gelled aqueous fluids may exhibit very high viscosity at very low shear rates and under static conditions, and this fluid property can be further enhanced by the addition of select particles that associate the micelles together into a stronger network or a more connected network, which further limits the rate of agent release until the internal breaker degrades the viscous elongated micelle structures into non-viscous spherical micelle structures. It has been found that generally VES fluids do not damage formations to the extent that polymer gelled fluids do.

In the non-restrictive embodiment of placing a fluid loss control agent, the aqueous fluid is viscosified with a VES having an internal breaker so that the agent to be released is concentrated on the wellbore or on a fracture face as the desired location of release. A unique character of this method is that the VES micelles associate with one another in the aqueous fluid, and the associated micelles incorporate the agent and internal breakers therein (and other components). The VES viscosity is an important property used to place the agent to a desired location, and one or more internal breakers are used for quicker, delayed, or otherwise controlled release of the agent, where little to no formation damage occurs with this delay composition; that is, the viscoelastic surfactant viscosified fluid, when broken by the internal breaking agents, will have brine-like fluid viscosity and is easily and readily producible from the subterranean formation and will leave little to no formation permeability damage.

Agents that may be released include, but are not necessarily limited to, fluid loss control agents, bacteria, bacteria nutrients, biocides, preservatives, enzyme polymer breakers, oxidative polymer breakers, polymer breaker enhancers, chelating agents, microencapsulated chemicals, macroencapsulated chemicals, nanoencapsulated chemicals, fertilizers, zeolites, clays, pigments, inorganic minerals, inorganic flakes, ceramics, cement, shells, waxes, activated carbon, fullerenes, graphite, metals, metallic ions and complexes, resins, natural oils, refined oils, synthetic oils, fatty acids, proteins, amino acids, siloxanes, organic acids, polymerized organic acids, natural polymers, derivatized polymers, synthetic polymers, salts, sugars, water wetting surfactants, oil wetting surfactants, emulsifying agents, demulsifying agents, anti-oxidants, oxygen scavengers, meta-silicates, amines, pH buffers, friction reducers, clay inhibitors, scale inhibitors, gas hydrate inhibitors, corrosion inhibitors, paraffin inhibitors, stimulation chemicals, production chemicals, remedial cleanup agents, water-block removal agents, scale removal agents, diverting agents, fine migration control agents, and the like and combinations thereof. As described herein, microencapsulation and microcapsules are defined herein as concerning encapsulated materials where the diameter of the microcapsule is 100 microns down to 1000 nanometers. Macroencapsulation involves the encapsulation of materials where the diameter of the macrocapsule is greater than 100 microns. Nanoencapsulation and nanocapsules refer to encapsulated materials where the diameter of the capsule is 1000 nanometers or less. The maximum size of the particulates, solids and other agents within the association of micelles is about 10 millimeters.

The delayed release chemicals may also be and involve other more common agents in cementing, stimulation and production of subterranean formation, including long horizontal reservoir drilling and completion, as well as for transporting and delayed release of agents along a pipeline or other transmission conduit. In such applications, in the "parent" product (i.e. VES product gelled in an aqueous fluid), the agent may be complexed rather than suspended or solubilized, where agent release may be triggered upon the parent product use, and the like. It is expected that this technology may have significant usage in other industries, including, but not necessarily limited to, agricultural applications, environmental remediation, waste disposal processes, cleaning processes, cosmetic uses, building and construction industry, mining industry, textile arts, and the like.

Aqueous Base Fluids and Viscoelastic Surfactants

In the methods and compositions described herein, for instance an aqueous fracturing fluid, as a non-limiting example, is first prepared by blending a VES into an aqueous base fluid. The aqueous base fluid could be, for example, water, brine, aqueous-based foams or water-alcohol mixtures. The brine base fluid may be any brine, conventional or to be developed which serves as a suitable media for the various components. As a matter of convenience, in many cases the brine base fluid may be the brine available at the site used in the completion fluid, for a non-limiting example.

As noted, the aqueous fluids gelled by the VESs herein may optionally be brines. In one non-limiting embodiment, the brines may be prepared using salts including, but not necessarily limited to, NaCl, KCl, CaCl$_2$, MgCl$_2$, NH$_4$Cl, CaBr$_2$, NaBr, sodium formate, potassium formate, and other commonly used stimulation and completion brine salts. The concentration of the salts to prepare the brines can be from about 0.5% by weight of water up to near saturation for a given salt in fresh water, such as 10%, 20%, 30%, 40% and higher percent salt by weight of water. The brine can be a combination of one or more of the mentioned salts, such as a brine prepared using NaCl and CaCl$_2$ or NaCl, CaCl$_2$, and CaBr$_2$ as non-limiting examples.

The viscoelastic surfactants suitable for use herein may include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or dipropionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents RN$^+$(R')$_2$O$^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include CLEARFRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Oil Tools as SURFRAQ™ VES. SURFRAQ is a VES liquid product that is 50% TAPAO and 50% propylene glycol. These viscoelastic surfactants are capable of gelling aqueous solutions to form a gelled base fluid. The additives herein may also be used in DIAMOND FRAQ™ which is a VES system, similar to SURFRAQ, which contains VES breakers sold by Baker Oil Tools.

The amount of VES included in the treating fluid depends on the type of application. For hydraulic fracturing treatments, the concentration of VES product to use is related to generating, creating or producing enough fluid viscosity to control the rate of fluid leak off into the pores of the fracture, which is also dependent on the type and amount of fluid loss control agent used, and both work together to improve fluid efficiency to develop the optimum size and geometry of the fracture within the reservoir for enhanced reservoir production of hydrocarbons and to also keep the chemicals, particles (e.g. proppant or other particles) and/or other agent complexed, suspended or viscosity trapped therein during the fluid injecting step. For remedial treatments, such as removal of residual crosslinked polymer filtercake typically left within a hydraulic fracture after a crosslinked polymer fluid fracturing treatment, the distribution of an enzyme or oxidative polymer breaker agent within the damaged hydraulic fracture can be significantly improved by using a VES-based treating fluid containing a moderate to high amount of VES product in combination with a VES micelle associating fluid loss agent. The micelle associating agent allows the development of pseudo-filtercake to: 1) reduce the amount of treating fluid leak-off away from the fracture; and 2) keep more treatment fluid within the hydraulic fracture and thereby significantly improve the distribution of the treating fluid containing polymer breaker. For a treatment to place clay stabilizer within a producing formation to reduce the rate of fines migration to the wellbore region, a low to moderate concentration of VES product in KCl brine will enhance the distribution of the clay stabilizer within the treated reservoir. Stages of lower viscosity followed by higher viscosity VES-based treating fluid can also be used to aid uniform distribution of the treating fluid with clay stabilizer in the reservoir. A similar treatment can be devised for placement of formation fines control agent or agents within the reservoir or more specifically on proppant particles within a hydraulic fracture. Thus, depending on the application, the VES is added to the aqueous fluid in concentrations ranging from about 0.5 to about 12.0% by volume of the total aqueous fluid (5 to 120 gallons per thousand gallons (gptg)). In another non-limiting embodiment, the range is from about 1.0 to about 6.0% by volume VES product. In an alternate, non-restrictive form, the amount of VES ranges from about 2 to about 10 volume %.

Internal Breakers

In one particularly useful embodiment, the aqueous viscoelastic treating fluid contains internal breakers. By the term "internal breakers" is meant that the breaker is present in the fluid along with the composition causing the increase in viscosity, e.g. polymers or VESs, as contrasted with adding the breaker to the gelled fluid separately, for instance, injecting the breaker downhole after the gelled treating fluid. Although in some non-limiting embodiments, polymers are not used to increase the viscosity of the aqueous fluid, they may in some embodiments be used together with VESs. Conventional polymer breakers include, but are not limited to, enzymes, oxidizers, bacteria, acids, and combinations thereof.

The compositions of the treatment fluids herein may be a synergistic combination of internal breakers with one or more high temperature optional stabilizers, optional viscosity enhancers, fluid loss control agents, and mix water brines up to 14.4 ppg salinity (1.7 kg/liter), e.g. $CaBr_2$. The internal breakers described herein surprisingly work in the presence of several types of VES micelle stabilizers, micelle viscosity enhancers, micelle fluid loss control agents, a wide range of mix water salinity (including divalent ions like calcium and magnesium) for fluid temperature applications ranging from about 80° F. to about 300° F. (about 27 to about 149° C.). The ability of these agents to work together by compatible mechanisms is remarkably unique and allows the many enhanced VES fluid performance properties to be combined.

In polymer filter cake, most of breaker in the polymer fluid system is leaked-off into the formation matrix and leaves a high concentration of polymer in the cake (fracture). The breaker is not attached to or connected with the polymer. In VES pseudo-filter cake, the internal breaker appears to be contained or resident inside of VES micelles and thus goes wherever VES micelles go, in one non-limiting explanation. The fluid loss control agents may work from about 80° F. to about 300° F. (about 27 to about 149° C.). A wide range of particle types and properties have been found of utility to improve the performance of the VES treating fluid, which includes, but is not necessarily limited to, surface adsorption, crystal surface charges, piezoelectric and pyroelectric particles, and nano-sized particle properties and technology. Additionally, the synergistic use of internal breakers with the pseudo-filter cake has been discovered to allow the pseudo-filter cake to be readily degraded into an easily producible broken VES fluid. Another improved performance feature is how the fluids herein, a portion of which may inevitably leak-off into the pores of the reservoir during a treatment, can carry with it internal breaker that converts the VES fluid into an easily producible or flowable fluid without the need for contacting reservoir hydrocarbons and which also delivers the agent downhole at a particular time and thus a particular place. Contact of a VES-gelled aqueous fluid with reservoir hydrocarbons is one method of breaking the viscosity of these fluids. The methods and fluids herein are significant improvements over conventional methods and compositions, which, without contacting hydrocarbons, exhibit very high viscosity at very low shear rates, such as 2000 cps or more at 1 $sec^{-1}$ shear rate. The very high viscosity of VES fluids at very low shear rates makes the leaked-off VES fluid within the pores of the formation require higher reservoir pressure in order to move and remove (clean up) the fluid within the reservoir matrix. Laboratory core clean-up tests have shown that very little pressure and time is required to remove internally broken VES from the pore matrix of Berea cores as compared to VES fluids without an internal breaker.

A viscoelastic surfactant-internal breaker aqueous fluid system containing viscosity enhancers, VES stabilizers for high temperature, and fluid loss control agents and methods for using the systems for delivering agents relatively precisely to subterranean formations penetrated by a well bore have been discovered. A viscous gel starts to develop when the viscoelastic surfactant (VES) is mixed with an aqueous base fluid. A salt or other counterion may be used in the aqueous fluid containing VES to help promote viscous micelle formation. The VES-based fracturing fluid is pumped in one or more sequential stages. The stages of viscoelastic surfactant gelled fluid (that contains the mineral oil and/or fish oil, transition metal ion source, saponified fatty acid, unsaturated or saturated fatty acid or other internal breaker, e.g.) maintains a high viscosity prior to fracturing and other treating fluid applications and eventual breaking (viscosity reduction) of the fluid through action of the breaker and thus delivery of the agent. The viscosity of the VES gelled fluid is particularly improved, increased or enhanced, particularly at low shear rates, by the presence of particulate viscosity enhancers. One non-limiting example of a particulate viscosity enhancer is nano-size ZnO particles used at 0.05 to 0.1% by weight of VES treating fluid. In another non-limiting example, the fluid viscosity can be improved up to ten-fold compared to VES fluid without particulate viscosity enhancer.

The rate of fluid leak-off during a treatment is also significantly reduced by the presence of particulate fluid loss control agents. Further, the viscosity stability of the VES-gelled fluid may be improved or enhanced by the presence of particulate high temperature viscosity stabilizing agents. The viscosity enhancers, viscosity stabilizers, and fluid loss control agents, further improve the ability of the VES-based aqueous fluid to place agents in select or predetermined locations within the reservoir, and each work by a mechanism that does not inhibit the activity or mechanism of the other. In one non-limiting example, the presence of a high temperature viscosity stabilizer does not inhibit the activity of the internal breakers. In another non-limiting example, the presence and activity of a fluid loss control agent does not inhibit the breaking activity of an internal breaker. After completion of the pumping treatment and shut-in of the well, the internal breaker (e.g. mineral oil and/or fish oil) breaks the viscous gel, i.e. lowers the viscosity of the fracturing fluid readily and easily in the presence of the viscosity stabilizers, viscosity enhancers, and the like. The internally broken VES fluid is very easy to flow back with the producing fluid, leaving little or no damage to the formation. Very little reservoir pressure and time is required to produce and clean up the broken VES fluid. No reliance on reservoir hydrocarbons is required to contact the VES fracturing fluid and reduce its viscosity, and thus release the agent at a time later than injection through the wellbore. Because of their nanometer size and the minute amount used, the particulate viscosity enhancers and stabilizers are also readily producible and will readily clean-up and flowback with the broken VES fluid, leaving little to no particulate damage to the formation.

As noted, aqueous fluids gelled with viscoelastic surfactants have been previously used in wellbore completions, such as hydraulic fracturing, without the use of an internal breaker system, and typically rely on external downhole conditions for the VES-gelled fluid to break, such as dilution with reservoir brine and more importantly gel breaking through interaction with reservoir hydrocarbons during production of such reservoir fluids to the surface. However, reliance on external downhole conditions has showed instances where unbroken or poorly broken VES fluid remains within the reservoir after a VES fluid treatment and has impaired hydrocarbon production. There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). There are other known methods, but they are relatively slow—for instance the use of VES-gel breaking bacteria with fluid viscosity break times ranging from half a day up to 7 days. There has evolved in the stimulation fluid art an industry standard need for "quick gel break", but for VES-gelled fluids this has been a substantially challenging problem. There needs to be a method for breaking VES-gelled fluids that can be as easy, as quick, and as economic as breaking conventional polymeric fluids, in one non-limiting embodiment, using an internal breaker. At the same time, it is not desirable to reduce the viscosity of the fluid, i.e. break the gel, immediately or essentially instantaneously. Of concern is the fact than an unbroken VES fluid has exceptionally high viscosity at very low shear rate and static conditions which makes it difficult for reservoir hydrocarbons to contact all of the VES fluid and to displace it from the pores of a treated reservoir. This is particularly true for gas reservoirs and crude oil reservoirs that have heterogeneous permeability with high relative permeability sections present.

New methods have been discovered to reduce the viscosity of aqueous fluids gelled with viscoelastic surfactants (i.e. surfactants that develop viscosity in aqueous brines, including chloride brines, by formation of rod- or worm-shaped micelle structures). The new methods remove the need or reliance on reservoir hydrocarbons to contact, break, and cleanup the viscoelastic fluid. The improvements will allow relatively very quick breaks, such as within about 1 to about 16 hours, compared to using bacteria to break VES which takes at least 48 or more hours, and more typically 4 to 7 days. In another non-limiting embodiment the break occurs within about 1 to about 8 hours; alternatively from about 1 to about 4 hours, and in another non-restrictive version about 1 to about 2 hours. The breaker components herein can be used as an internal breaker, e.g. added to the gel after batch mixing of a VES-gel treatment, or added on-the-fly after continuous mixing of a VES-gel treatment using a liquid additive metering system in one non-limiting embodiment, or the components may be used separately, if needed, as an external breaker solution to remove VES gelled fluids already placed downhole. Internal breakers suitable for the methods and compositions herein include, but are not necessarily limited to, transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof. Bacteria may also be used alone or conjunction with these other internal breakers, although as noted, reducing the viscosity of VES gelled fluids with bacteria is relatively slow. The use of bacteria as a viscosity breaker for VES gelled fluids is described in U.S. Pat. No. 7,052,901 to Baker Hughes, incorporated herein in its entirety by reference.

The internal breakers (e.g. mineral oils, hydrogenated polyalphaolefin oils, saturated fatty acids, polyunsaturated fatty acids, and the like) are not solubilized in the brine, since they are inherently hydrophobic, but rather interact with the VES surfactant worm-like micelle structures initially as dispersed microscopic oil droplets and thus form an oil-in-water type emulsion where the oil droplets are dispersed in the "internal phase" as a "discontinuous phase" of the brine medium/VES fluid which is the "outer phase" or "continuous phase". Laboratory tests have shown that small amounts of unsaturated fatty acids, enough to eventually completely the break VES viscosity, will not spontaneously degrade VES viscosity upon individual association and dispersion within the VES micelles, but will become active to degrade VES viscosity upon activation, such as auto-oxidation of the fatty acids to products that disrupt the elongated, "rod-like" or "worm-like" micelles.

Surprisingly and unexpectedly the method may employ one or more mineral oil (as a non-limiting example of a suitable breaker) as the breaking component. This is surprising because, as previously discussed, the literature teaches that contact of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is influenced by type and amount of salts within the mix water (i.e. seawater, KCl, NaBr, $CaCl_2$, $CaBr_2$, $NH_4Cl$ and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of breaker (e.g. mineral oil) used, the distillation range of the mineral oil, its kinematic viscosity, the presence of components such as aromatic hydrocarbons, and the like.

It is important to add the lower molecular weight mineral oils after the VES product is added to the aqueous fluid.

However, for higher molecular weight mineral oils, types like GLORIA® and HYDROBRITE® 200 from Crompton Corporation, they may be added before, during or after the VES product addition. Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, base oil, white mineral oil, and white oil.

In one non-limiting embodiment the mineral oil is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, BENOL®, CARNATION®, KAYDOL®, SEMTOL®, HYDROBRITE® and the like mineral oils available from Crompton Corporation, ESCAID®, EXXSOL® ISOPAR® and the like mineral oils available from ExxonMobil Chemical, and similar products from other mineral oil manufacturers. The ESCAID 110® and Conoco LVT-200® mineral oils have been well known components of oil-based drilling muds and the oil industry has considerable experience with these products, thus making them attractive choices. The mineral oils from ConocoPhillips Company with their high purity and high volume use within other industries are also an attractive choice.

It has been discovered in breaking VES-gelled fluids prepared in monovalent brines (such as 3% KCl brine) that at temperatures below about 180° F. (82° C.) ESCAID® 110 works well in breaking VES-gelled fluids, and that at or above about 140° F. (60° C.) HYDROBRITE® 200 works well. The use of mineral oils herein is safe, simple and economical. In some cases for reservoir temperatures between about 120° to about 240° F. (about 49° to about 116° C.) a select ratio of two or more mineral oil products, such as 50 wt % ESCAID® 110 to 50 wt % HYDROBRITE® 200 may be used to achieve controlled, fast and complete break of a VES-gelled fluid.

It has also been discovered that type and amount of salt within the mix water used to prepare the VES fluid (such as 3 wt % KCl, 21 wt % $CaCl_2$, use of natural seawater, and so on) and/or the presence of a VES gel stabilizer (such as VES-STA 1 available from Baker Oil Tools) may affect the activity of a mineral oil in breaking a VES fluid at a given temperature. For example, ESCAID® 110 at 5.0 gptg will readily break the 3 wt % KCL based VES fluid at 100° F. (38° C.) over a 5 hour period. ESCAID® 110 also has utility as a breaker for a 10.0 ppg $CaCl_2$ (21 wt % $CaCl_2$) based VES fluid at 250° F. (121° C.) when a VES stabilizer (2.0 pptg VES-STA 1) is included.

More information about using mineral oils, hydrogenated polyalphaolefin oils and saturated fatty acids as internal breakers may be found in U.S. Pat. No. 7,347,266, incorporated by reference herein in its entirety.

In one non-limiting embodiment these gel-breaking products or breakers work by rearrangement of the VES micelles from rod-shaped or worm-shaped elongated structures to spherical structures. The breaking components described herein may also include the unsaturated fatty acid or polyenoic and monoenoic components of U.S. Patent Application Publication 2006/0211776, Ser. No. 11/373,044 filed Mar. 10, 2006, incorporated herein in its entirety by reference. In one non-limiting embodiment these unsaturated fatty acids (e.g. oleic, linoleic, linolenic, eicosapentaenoic, etc.) may possibly be used alone—in oils they are commonly found in (e.g. flax oil, soybean oil, etc.), and can be provided as custom fatty acid blends (such as Fish Oil 18:12TG by Bioriginal Food & Science Corp.) —or used together with the mineral oils herein. In another non-limiting embodiment, natural saturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. In some cases it is preferred that the plant or fish oil be high in polyunsaturated fatty acids, such as flax oil, salmon oil, and the like. The plant and fish oils may be refined, blended and the like to have the desired polyunsaturated fatty acid composition modified for the compositions and methods herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein.

In one non-limiting embodiment, the breaking or viscosity reduction is triggered or initiated or facilitated by heat. These mineral, plant, and animal oils will slowly, upon heating, break or reduce the viscosity of the VES gel with the addition of or in the absence of any other viscosity reducing agent. The amount of internal breaker (mineral oil, e.g.), needed to break a VES-gelled fluid may in some cases be temperature dependent, with less needed as the fluid temperature increases. For mineral oil, the kinematic viscosity, molecular weight distribution, and amount of impurities (such as aromatics, olefins, and the like) also appear to influence the rate in which a mineral oil will break a VES-gelled fluid at a given temperature. For unsaturated fatty acid oils the type and amount of unsaturation (i.e. double carbon bonds) appears to be the major influence on the rate at which the fatty acid oil will break the VES-gelled fluid at a given temperature. Once a fluid is completely broken at an elevated temperature and cooled to room temperature a degree of viscosity reheal may occur but in most cases no rehealing is expected. The effective amount of mineral oil, plant oil and/or fish oil ranges from about 0.1 to about 20 gptg based on the total fluid, in another non-limiting embodiment from a lower limit of about 0.5 gptg, where "total fluid" means overall VES gelled fluid with all components of the particular embodiment. Independently the upper limit of the range may be about 12 gptg based on the total fluid. (It will be appreciated that units of gallon per thousand gallons (gptg) are readily converted to SI units of the same value as, e.g. liters per thousand liters, $m^3/1000$ $m^3$, etc.).

Controlled viscosity reduction rates can be achieved at a temperature of from about 70° F. to about 400° F. (about 21 to about 204° C.), and alternatively at a temperature of from about 100° F. independently to an upper end of the range of about 280° F. (about 38 to about 138° C.), and in another non-limiting embodiment independently up to about 300° F. (149° C.). In one non-limiting embodiment, the fluid designer would craft the fluid system in such a way that the VES gel would break at or near the formation temperature to deliver the agent downhole at a predetermined or designed location.

In one non-limiting embodiment, fluid internal breaker design would be based primarily on formation temperature, i.e. the temperature the fluid will be heated to naturally in the formation once the acidizing, fracturing or other treatment is over. Fluid design may take into account the expected duration or exposure of the fluid at formation temperature during a treatment. There would generally be no additional temperature or heating the VES fluid would see or experience other than original reservoir temperature.

In another non-limiting example, a combination of internal breakers may have synergistic results, that is, the breaking profile of the fluid over time may be improved when two types of internal breakers are used rather only one or the other. The use of mineral oil alone, like the use of polyenoic breaker alone, does not give the rate and degree of viscosity reduction over time as does the combination of mineral oil with polyenoic breaker. By using combinations of internal breakers, both the initial and final break of the VES fluid may be customized, that is, have improved overall breaking performance. One breaker mechanism may help speed up another breaker mechanism. Surprisingly, even with two internal breaker mechanisms present in the VES fluid, the novel pseudo-filter cake with fluid loss control agent may show excellent fluid loss control.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular breaker used (e.g. mineral, plant, and/or fish oil, unsaturated fatty acid, etc.); the temperature of the fluid; the downhole pressure of the fluid; the starting pH of the fluid; and the complex interaction of these various factors. Nevertheless, in order to give an approximate idea of the proportions of the various breaking components to be used in the methods herein, approximate ranges will be provided. In an alternative, non-limiting embodiment the amount of mineral oil that may be effective herein may range from about 5 to about 25,000 ppm, based on the total amount of the fluid. In another non-restrictive version, the amount of mineral oil may range from a lower end of about 50 independently to an upper end of about 12,000 ppm.

The use of transition metal ion sources as breakers for VES-gelled fluids is more fully described in U.S. Ser. No. 11/145,630 filed Jun. 6, 2005, published as U.S. Patent Application Publication 2006/0041028, incorporated by reference herein in its entirety. Briefly, the transition metal ion source used as an internal breaker may include a transition metal salt or transition metal complex, where the transition metal may be from Groups VA, VIA, VIIA, VIIIA, IB, IIB, IIIB, and IVB of the Periodic Table (previous IUPAC American Group notation). One or more chelating agents and/or one or more reducing agent sources may also be used in conjunction with the transition metal ion sources as breaking agents. In one non-limiting embodiment, the amount of transition metal ion from the transition metal ion source ranges from about 0.01 to about 300 ppm, based on the total fluid.

The use of saponified fatty acids as breakers for VES gelled aqueous fluids is more fully described in U.S. Ser. No. 11/372,624 filed Mar. 10, 2006, published as U.S. Patent Application Publication 2006/0211775, incorporated by reference herein in its entirety. Briefly, the saponified fatty acids are soap reaction products of a fatty acid with an alkaline compound selected from the group consisting of organic bases, alkali metal bases, alkaline earth metal bases, ammonium bases, and combinations thereof. The soap reaction products may be pre-formed prior to addition as an internal breaker, or may be formed in situ. Suitable fatty acids include, but are not limited to those found in plant oils and animal oils. Suitable alkali metal bases, alkaline earth metal bases and ammonium bases include, but are not necessarily limited to oxides and hydroxides of cations of the group including Na, K, Cs, Ca, Mg, Ba, Fe, Mn, Cu, Zn, Zr, Mo, V, Co, Al, Sn, $NH_4$, $(CH_3)_4N$, and mixtures thereof. Suitable organic bases include, but are not necessarily limited to, diethanolamine, triethanolamine, choline bases and mixtures thereof. In one non-restrictive embodiment herein, the amount of saponified fatty acid that is effective as a viscosity breaker ranges from about 50 to about 20,000 ppm based on the total viscoelastic surfactant gelled fluid.

The use of the disclosed breaker systems is ideal for controlling viscosity reduction of VES based fracturing treating fluids. The breaking system may also be used for breaking gravel pack fluids, acidizing or near-wellbore clean-up fluids, loss circulation pill fluids composed of VES, drilling fluids composed of VES, targeted placement of delayed release agents, and for many other applications. The breaker system may additionally work for foamed fluid applications (hydraulic fracturing, acidizing, and the like), where $N_2$ or $CO_2$ gas is used for the gas phase. The VES breaking methods herein are a significant improvement in that it gives breaking rates for VES based fluids that the industry is accustomed to with conventional polymer based fluids, such as borate crosslinked guar and linear HEC (hydroxyethylcellulose). Potentially more importantly, the use of these internal breaker systems in combination with external downhole breaking conditions should help assure that the agents (chemicals, particles, etc.) are delivered relatively precisely on a time-delayed basis at the downhole location desired.

In one non-limiting embodiment, the compositions herein will degrade the gel created by a VES in an aqueous fluid, by disaggregation or rearrangement of the VES micellar structure. However, the inventors do necessarily not want to be limited to any particular mechanism. Also, in another non-restrictive version, the only component present in the VES gelled aqueous fluid that reduces viscosity is one of the internal breakers described herein, or mixtures thereof. That is, a separately introduced external breaker component introduced after the VES-gelled fracturing fluid is not used (e.g. various clean-up fluids). However, conditions (such as elevated temperature) and already existing chemicals (reservoir hydrocarbons) may be present when and where the internal breakers are included, either intentionally or incidentally.

Fluid Loss Agents

It has been discovered that the addition of alkaline earth metal oxides, such as magnesium oxide, and alkaline earth metal hydroxides, such as calcium hydroxide, to an aqueous fluid gelled with a VES improved the fluid loss of these brines. The fluid loss control agents herein are believed to be particularly useful in directing placement of VES-gelled fluids containing select agents to be used for well completion, remedial and/or stimulation. In another particularly useful application of directing placement of VES-gelled fluid containing select agents is for long horizontal completions, such as 4000 feet (1220 meters) or longer horizontal wellbores where uniform coverage is often problematic using conventional methods.

The VES-gelled fluids may further comprise proppants or gravel, if they are intended for use as fracturing fluids or gravel packing fluids, although such uses do not require that the fluids include proppants or gravel. In particular, the VES-gelled aqueous fluids have improved (reduced, diminished or prevented) fluid loss over a broad range of temperatures, such as from about 70 (about 21° C.) to about 400° F. (about 204° C.); alternatively up to about 350° F. (about 177° C.), and in another non-limiting embodiment up to about 300° F. (about 149° C.). Use of MgO and the like particles, as disclosed within U.S. Pat. No. 7,343,972 (incorporated herein by reference in its entirety) is for high temperature stability of VES viscosity, and applies for temperature applications above about 190° F. (about 88° C.). The use of MgO and the like particles for the fluid loss control herein has application and functionality to much broader temperature range, such as from about 70° F. to about 400° F. (about 21° C. to about 204° C.), and may be used in low salinity monovalent brines, such as 3% KCl.

The fluid loss control agents (e.g. MgO and/or $Mg(OH)_2$, and the like) appear to help develop a pseudo-filter cake of VES micelles by associating with them as well as ions and particles (in one non-restrictive explanation) to produce a novel and unusual viscous fluid layer of pseudo-crosslinked elongated micelles on the reservoir face that limits further VES fluid leak-off. Additionally, the art may be further advanced by use of nanometer-sized fluid loss control agents that also form a similar viscous fluid layer of pseudo-crosslinked micelles on the formation face that are equivalent to micron-sized fluid loss control agents herein in controlling rate of VES fluid loss, yet can be non-pore plugging and physically easier to produce back with the VES fluid after a VES treatment. That is, the effectiveness of the method is largely independent of the size of the fluid loss control agents.

Additionally, it has been discovered that the range in reservoir permeability does not significantly control the rate of fluid leaked-off when the additives described herein are within a VES fluid. Thus, the rate of leak-off in 2000 md reservoirs will be comparable to rate of leak-off in 100 and 400 md reservoirs. This enhanced control in the amount of fluid leaked-off for higher permeability reservoirs also expands the range in reservoir permeability to which the VES fluid may be applied. The expanded permeability range may allow VES fluids to be used successfully within reservoirs with permeabilities as high as 2000 to 3000 or more millidarcies (md). Prior VES-gelled aqueous fluids have reservoir permeability limitations of about 800 md, and even then they result in 2- to 4-fold volume of VES fluid leak-off rate as compared with the fluid loss control achievable with the methods and compositions herein.

Prior art VES-gelled aqueous fluids, being non-wall-building fluids (i.e. there is no polymer or similar material build-up on the formation face to form a filter cake) that do not build a filter cake on the formation face, have viscosity-controlled fluid leak-off into the reservoir. By contrast, the methods and compositions herein use a fluid loss agent that associates with the VES micelle structures through chemisorption or/and particle surface charge attraction, allowing pseudo-crosslinking of the elongated micelles to occur, in one non-limiting explanation of the mechanisms at work herein. This unique association has been found to form a highly viscous layer of crosslinked-like VES fluid on the formation face, thus acting as a pseudo-filter cake layer that limits and controls additional VES fluid from leaking-off into the reservoir pores. The pseudo-filter cake is composed of VES micelles that have VES surfactants with very low molecular weights of less than 1000. This is in contrast to and different from polymeric fluids that form true polymer mass accumulation-type filter cakes by having very high molecular weight polymers (1 to 3 million molecular weight) that due to their size are not able to penetrate the reservoir pores, but bridge-off and restrict fluid flow in the pores.

The fluid loss agents herein associate with the VES micelles and as VES fluid is leaked-off into the reservoir a viscous layer of micelles and fluid loss control particles and/or ions accumulate on the formation face, thus reducing the rate of VES fluid leak-off. It has been discovered that particulate plugging of the reservoir pores is not the mechanism of leak-off control or the mechanism that allows development of the viscous micelle layer. Tests using nanometer-sized fluid loss agents (where "nanometer-sized" is defined herein as on the order of $10^{-9}$ to $10^{-8}$ meters), that have no potential to bridge or plug reservoir pores of 1 md or higher reservoir permeability, still develop the viscous micelle layer. These materials still have the same or similar leak-off control-rate profiles (i.e. rate of fluid leak-off over time) as the 1 to 5 micron size fluid loss control particles useful for the compositions and methods herein that are larger. Thus, the size of the fluid loss agent is not a controlling and/or primary factor of methods and compositions herein, that is, to control VES fluid leak-off rate.

The fluid loss control agents useful herein include, but are not necessarily limited to, slowly soluble alkaline earth metal oxides or alkaline earth metal hydroxides, transition metal oxides, transition metal hydroxides, or mixtures thereof. In one non-limiting embodiment, the alkaline earth metal and transition metals in these additives may include, but are not necessarily limited to, magnesium, calcium, barium, strontium, aluminum, zirconium, vanadium, molybdenum, manganese, iron, cobalt, nickel, palladium, copper, zinc, tin, antimony, titanium, combinations thereof and the like. In one non-restrictive version, the transition metals such as copper, tin, nickel, and the like may be used in relatively low concentration compared to or in combination with the alkaline earth metals. In one non-restrictive embodiment, the amount of additive ranges from about 2 to about 200 pounds per thousand gallons (pptg) (about 0.2 to about 24 $kg/m^3$) based on the aqueous viscoelastic treating fluid. In another non-restrictive embodiment, the amount of additive may have a lower limit of about 6 pptg (about 0.7 $kg/m^3$) and independently an upper limit of about 80 pptg (about 9.6 $kg/m^3$), and in another non-restrictive version a lower limit of about 8 pptg (about 1 $kg/m^3$) and independently an upper limit of about 40 pptg (about 4.8 $kg/m^3$), and in still another non-limiting embodiment, a lower limit of about 10 pptg (about 1.2 $kg/m^3$) and independently an upper limit of about 25 pptg (about 3 $kg/m^3$).

The amount of transition metal oxides or transition metal hydroxides may range from about 0.0001 pptg (about 0.01 $g/m^3$) independently to an upper limit of about 4 pptg (about 0.45 $kg/m^3$), and in another non-restrictive version from about 0.1 pptg (about 12 $g/m^3$) independently up to about 0.5 pptg (about 60 $g/m^3$). In another non-limiting embodiment, the particle size of the fluid loss control agents ranges between about 1 nanometer independently up to about 0.2 millimeter. In another non-limiting embodiment, the particle size of the fluid loss control agents ranges between about 4 nanometers independently up to about 74 microns. The fluid loss control agents may be added along with the VES fluids. In another non-restrictive version the fluid loss control agents may have a surface area of between about 10 to about 700 square meters per gram ($m^2/g$).

Delayed Release Agents

A chemical or biological agent (e.g. crosslinked polymer, acid, or biocide, among others) that is a useful component of a completion, stimulation, remedial or workover fluid can, in certain cases, be undesirably neutralized or degraded before reaching the site at which it is to have its effect. Therefore, in certain instances, more of the agent is used in order to be effective and to compensate for agent that is lost in delivering the agent to the site. Thus, there is a need for a more efficient way to deliver useful chemical and biological agents to a desired location in a well. In the methods and compositions herein, these and other agents may be present within the association of micelles and would not be spent, that is, would be kept from reacting or being effective until the fluid containing the association of micelles is delivered downhole, or to some other remote location, where the gel is broken with an internal breaker, the micelles dissociate, and the agent is delivered to a particular location at a point in time later or delayed from its initial injecting into a well bore.

Such chemical or biological agents may include, but not necessarily be limited to, fluid loss control agents, oxidative polymer breakers, enzyme polymer breakers, polymer breaker enhancers, microencapsulated chemicals, macroencapsulated chemicals, nanoencapsulated chemicals, fertilizers, zeolites, clays, pigments, inorganic minerals, inorganic flakes, ceramics, cement, shells, waxes, activated carbon, fullerenes, graphite, metals, metallic ions and complexes, resins, natural oils, refined oils, synthetic oils, fatty acids, proteins, amino acids, siloxanes, organic acids, polymerized organic acids, scale inhibitors, gas hydrate inhibitors, stimulation chemicals, production chemicals, pipeline chemicals, water treatment chemicals, mining chemicals, detergent chemicals, environmental remediation chemicals, remedial cleanup agents, water-block removal agents, crosslinkers, polymers, biocides, preservatives, corrosion inhibitors, corrosion dissolvers, pH modifiers, metal chelators, metal complexors, antioxidants, wetting agents, polymer stabilizers, clay stabilizers, scale dissolvers, wax inhibitors, wax dissolvers, asphaltene precipitation inhibitors, waterflow inhibitors, sand consolidation chemicals, permeability modifiers, foaming agents, diverting agents, microorganisms, nutrients for microorganisms, salts, sugars, water wetting surfactants, oil wetting surfactants, emulsifying agents, demulsifying agents, anti-oxidants, oxygen scavengers, meta-silicates, amines, friction reducers, fines migration control agents, and the like. As previously noted, the delayed release agents may be solids or liquids. The delayed release agents may be oil-soluble, water-soluble and/or water dispersible.

The aqueous treatment fluid can also contain other additives common to the well service industry such as water wetting surfactants, non-emulsifiers and the like. In the methods and compositions herein, the base fluid may also contain additives which can contribute to breaking the gel (reducing the viscosity) of the VES fluid.

In another non-limiting embodiment, the treatment fluid may contain other viscosifying agents, other different surfactants, clay stabilization additives, scale dissolvers, biopolymer degradation additives, and other common and/or optional components.

Stabilizers

Additionally, select particulate fluid loss control agents herein may optionally be used at lower concentrations in the VES treating fluid as high temperature viscosity stabilizers; that is for stabilizing or sustaining the VES fluid viscosity at elevated fluid temperatures, such as above 180° F. (82° C.). Suitable viscosity stabilizers include, but are not limited to, magnesium oxide, magnesium hydroxide, calcium oxide, calcium hydroxide, sodium hydroxide, and the like. The select viscosity stabilizers may, in one non-limiting embodiment, have an average particle size of 500 nanometers or less, that is, to be preferably small enough to be non-pore plugging and thereby will remain with the VES fracturing fluid wherever it goes during the treatment and during flowback. More information about using these oxides and hydroxides as high temperature viscosity stabilizers may be found in U.S. Pat. No. 7,343,972 and U.S. Patent Application Publication No. 2008/0051302 A1, both of which are incorporated by reference herein in their entirety.

The increased viscosity of aqueous fluids gelled with viscoelastic surfactants (VESs) may also be maintained or stabilized by one or more stabilizers that are glycols and/or polyols. These glycols and polyols may stabilize the increased viscosity of VES-gelled fluids effectively over an increased temperature range, such as from about ambient to about 300° F. (about 149° C.). Even though some VESs used to increase the viscosity of aqueous fluids contain a glycol solvent, the use, addition or introduction of the same or different glycol or a polyol, possibly of increased purity, may improve the viscosity stability of the fluid as a whole. Suitable glycols for use with the stabilizing method herein include, but are not necessarily limited to, monoethylene glycol (MEG), diethylene glycol (DEG), triethylene glycol (TEG), tetraethylene glycol (TetraEG), monopropylene glycol (MPG), dipropylene glycol (DPG), and tripropylene glycol (TPG), and where the polyols include, but are not necessarily limited to, polyethylene glycol (PEG), polypropylene glycol (PPG), and glycerol and other sugar alcohols, and mixtures thereof. In the case where the stabilizer is a polyol, the molecular weight of the polyol may range from about 54 to about 370 weight average molecular weight, alternatively where the lower threshold is about 92 weight average molecular weight, and/or where the upper threshold is about 235 weight average molecular weight. Suitable proportions of glycols or polyol stabilizers that may be used, introduced or added, in one non-limiting embodiment, range from about 0.1 to 10.0% by volume based on the total of the aqueous fluid. In an alternate, non-restrictive embodiment, the lower end of this proportion range may be about 0.2% bv, and additionally or alternatively the upper end of this proportion range may be about 5.0% bv. Further details about polyol and/or glycol stabilizers may be found in U.S. Patent Application Publication No. 2007/0244015 A1, incorporated herein in its entirety by reference.

In a useful, non-restrictive embodiment herein, use with internal VES breakers can have synergistic clean-up effects for the fluid loss control agent and the VES fluid. Use of these compositions with an internal breaker may allow less VES fluid to leak-off into the reservoir, thus resulting in less fluid needed to be broken and removed once the treatment is over. Additionally, use of an internal breaker within the VES micelles may further enhance the breaking and removal of the pseudo-filter cake viscous VES layer that develops on the formation face with the fluid loss agents herein. Lab tests to date appear to show that the viscous VES pseudo-filter cake has the micelles readily broken down to the relatively non-viscous, more spherically-shaped micelles by use of an internal breaker, and also with use of encapsulated breaker, if used.

The invention will now be further illustrated with respect to particular Examples which are not intended to limit the invention in any regard, but instead are intended to further describe and illuminate certain non-restrictive embodiments of the invention.

EXAMPLE 1

Shown in FIG. 1 is a top view schematic illustration of a wellbore 10 with a schematic portrayal of a hydraulic fracture 11 extending in opposite directions (to the left and right of FIG. 1), where portions 12A are the near-wellbore sections of hydraulic fracture 11 and portions 12B are the near tip sections of hydraulic fracture 11. The area within oval-shaped region 14A represents the area of wellbore 10 and hydraulic fracture 11 commonly treated when placing a non-diverting treatment fluid is used to clean up the well, or when chemicals are placed within the hydraulic fracture 11; the edge of the area treated by the non-diverting treatment fluid is seen at 14B. It may be seen that some of the treatment fluid extends transverse to the fracture 11 (up and down, as seen in FIG. 1), and more significantly that large portions of hydraulic fracture 11, particularly the near tip sections 12B, are not treated.

Figure 2:
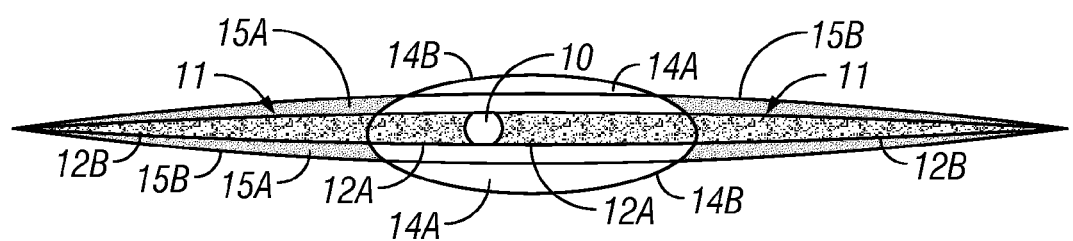
FIG. 2 is a schematic illustration of the top view of the wellbore and hydraulic fracture of FIG. 1 where the gray area indicates the placement of a delayed release treatment fluid with pseudo-crosslink fluid control.

Shown in FIG. 2 is the top view schematic illustration of a wellbore 10 and hydraulic fracture 11, where a delayed release treatment fluid having pseudo-crosslinked fluid loss control as described herein has been injected into the wellbore 10 and fracture 11. The gray portion 15A is a schematic diagram of the area of the hydraulic fracture 11 that is treated with this treatment fluid, where the edge of the gray area 15A treated with the delayed release treatment fluid is designated at 15B. It may be seen that due to the diverting nature of the treatment fluid described herein having pseudo-crosslinked micelles, the fluid extends the entire length of the hydraulic fracture to the near tip sections 12B and is not spent into the reservoir in the transverse direction indicted by area 14A and edge 14A.

EXAMPLE 2

Figure 3:
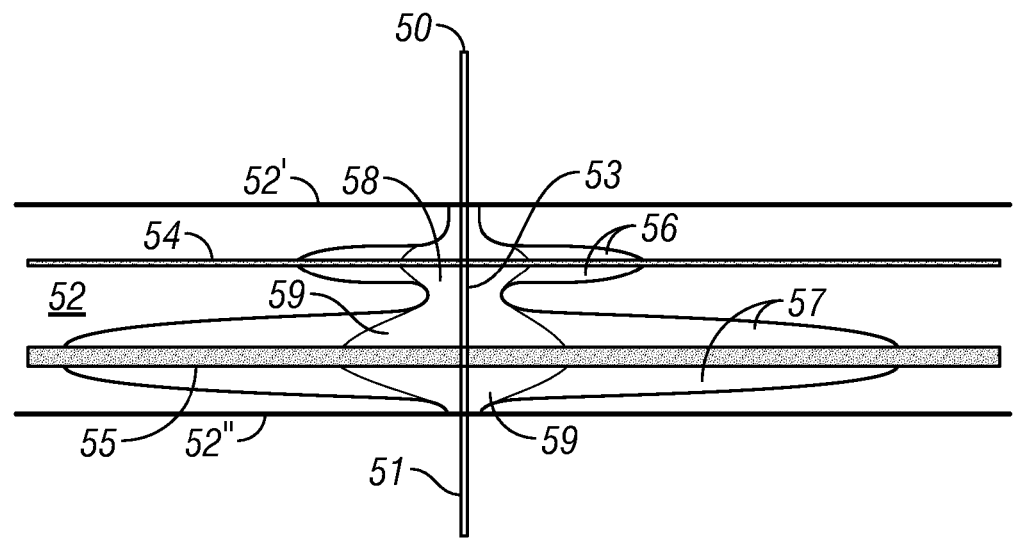
FIG. 3 is a schematic illustration of a cross-sectional, elevation view of a hydraulic fracture around a wellbore.

Shown in FIG. 3 is a cross-sectional, elevation view of hydraulic fracture and treatment fluid placements around a wellbore, where 50 is the top section of the wellbore, 51 is the bottom section of the wellbore, 52' and 52" represent the upper and lower boundaries, respectively, of the hydrocarbon-bearing reservoir 52 and the near wellbore section of the hydraulic fracture is shown at 53. Present within hydrocarbon-bearing reservoir 52 is an upper high permeability streak 54 and a lower high permeability streak 55 (which happens to be shown as deeper than upper streak 54, in this non-limiting Example). Reservoir 52 has been fractured along upper high permeability streak 54 as shown by upper section 56 of the hydraulic fracture and fractured along lower high permeability streak 55 as shown by lower section 57 of the hydraulic fracture. The white area 58 schematically illustrates the upper area where a conventional treatment fluid is placed and relatively larger white area 59 schematically illustrates the lower area where a conventional treatment fluid is placed.

Figure 4:
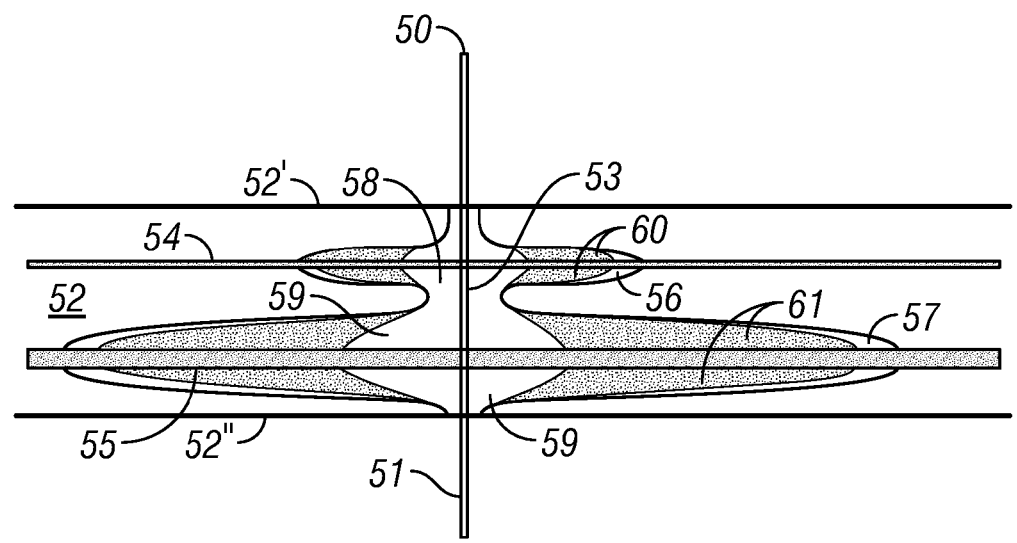
FIG. 4 is a schematic illustration of the cross-sectional, elevation view of the hydraulic fracture around a wellbore of FIG. 3 where the delayed release treatment fluid is shown as a gray area.

Shown in FIG. 4 is the cross-sectional, elevation view of hydraulic fracture of FIG. 3 where gray area 60 schematically illustrates the upper section of the placement of the delayed release treatment fluid as described herein. Similarly, gray area 61 schematically illustrates the lower section of the placement of the delayed release treatment fluid as described herein. These gray areas 60 and 61 show near complete coverage of the upper section 56 and lower section 57 of the hydraulic fracture, respectively, for the upper high permeability streak 54 and lower high permeability streak 55. It may be seen that coverage using the delayed release treatment fluids described herein is expected to be much greater than for conventional treatment fluids. FIGS. 3 and 4 herein are roughly comparable to FIGS. 1 and 2 previously described, but from an elevation point of view, rather than from above.

EXAMPLE 3

Figure 5:
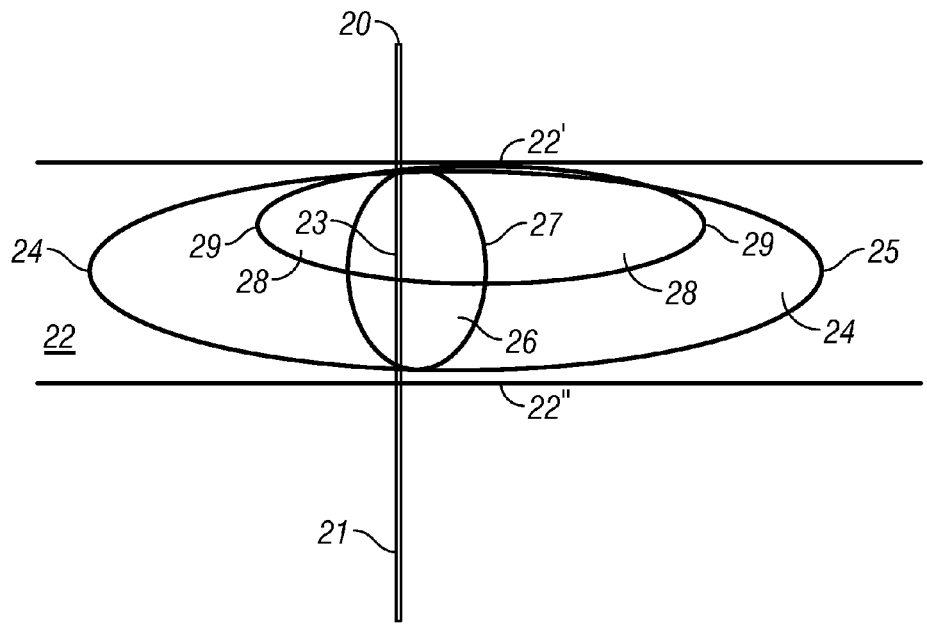
FIG. 5 is a schematic, cross-sectional, perspective view of wellbore and a hydraulic fracture.

Shown in FIG. 5 is a cross-sectional, perspective view of a hydraulic fracture and treatment fluid placement around a wellbore, where 20 is the top section of the wellbore, 21 is the bottom section of the wellbore, 22' and 22" represent the upper and lower boundaries, respectively, of the hydrocarbon-bearing reservoir 22 and the near wellbore section of the hydraulic fracture is shown at 23. The larger fracture 24 has an edge periphery 25. The first potential area around the immediate wellbore area and hydraulic fracture 24 where typical non-diverting treatment fluids are placed is shown at 26, where the edge of this area is shown at 27. A second potential area of wellbore and hydraulic fracture 24 where a typical non-diverting treatment fluid is placed is shown at 28, where the edge of this area is shown at 29. These areas are generally understood to be considerably less in volume than the entire area of fracture 24 and its boundary 25.

Figure 6:
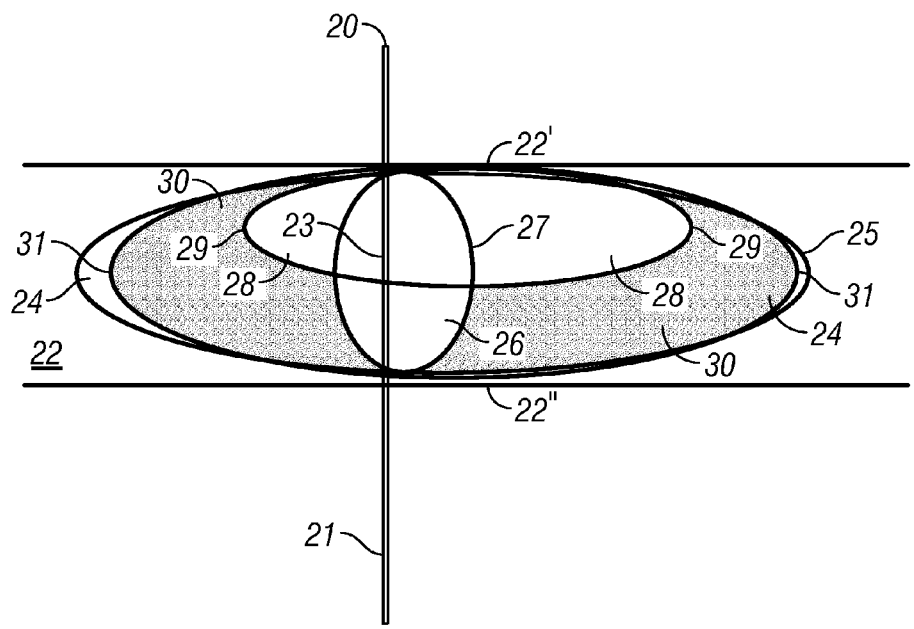
FIG. 6 is a schematic, cross-sectional, perspective view of the wellbore and hydraulic fracture of FIG. 5 where the gray area indicates placement of a delayed release treatment fluid illustrating near complete coverage of the fracture section.

Shown in FIG. 6 is the cross-sectional, perspective view of hydraulic fracture of FIG. 5 where gray area 30 schematically illustrates the potential area along fracture 24 where the delayed release treatment fluid as described herein may occur, where the edge 31 of this region 30 demonstrates nearly complete coverage of the fracture section 24 nearly to edge 25. FIG. 6 illustrates that the potential area 30 extends wider than first potential area 26 and deeper than second potential area 28. Thus, the delayed release treatment fluids described herein are expected to be more effective than conventional treatment fluids since they will more fully extend through and treat more of the hydraulic fracture in which they are placed.

In the foregoing specification, the invention has been described with reference to specific embodiments thereof as effective in delivering chemicals, particles, and other agents downhole using viscoelastic surfactant gelled fluids. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, internal breakers and chemicals, particles and other agents, and other components falling within the claimed parameters, but not specifically identified or tried in a particular composition, are anticipated to be within the scope of this invention.

The present invention may suitably comprise, consist or consist essentially of the elements disclosed and may be practiced in the absence of an element not disclosed.

The words "comprising" and "comprises" as used throughout the claims, are to be interpreted to mean "including but not limited to" and "includes but not limited to", respectively.

What is claimed is:

1. A method for delayed treating of a subterranean formation with an agent comprising:
   injecting an aqueous viscoelastic surfactant treating fluid through a wellbore and to the subterranean formation at a predetermined location within a reservoir, where the aqueous viscoelastic treating fluid comprises:
   an aqueous base fluid;
   a viscoelastic surfactant (VES) gelling agent in an amount effective to form a VES gel that increases the viscosity of the aqueous viscoelastic surfactant treating fluid;
   at least one internal breaker within the VES gel, where the internal breaker is selected from the group consisting of mineral oils, fish oils, hydrogenated polyalphaolefin oils, transition metal ion sources, reducing agent sources, chelating agent sources, alkali metal sources, alkaline earth metal sources, saponified fatty acids, unsaturated or saturated fatty acids, and combinations thereof; and
an agent within the VES gel,
breaking the VES gel with the internal breaker thereby reducing the viscosity of the aqueous viscoelastic surfactant treating fluid; and thereby releasing the agent from the VES gel into the predetermined location in the subterranean formation at a predetermined time after the injecting.

2. The method of claim 1 where the aqueous viscoelastic treating fluid further comprises one or more components selected from the group consisting of a temperature stabilizer, a viscosity stabilizer, viscosity enhancer, and combinations thereof.

3. The method of claim 1 where the aqueous base fluid is brine.

4. The method of claim 1 where the agent is selected from the group consisting of fluid loss control agents, bacteria, enzyme polymer breakers, oxidative polymer breakers, polymer breaker enhancers, microencapsulated chemicals, macroencapsulated chemicals, nanoencapsulated chemicals, scale inhibitors, gas hydrate inhibitors, stimulation chemicals, remedial cleanup agents, water-block removal agents, crosslinkers, polymers, biocides, corrosion inhibitors, corrosion dissolvers, pH modifiers, metal chelators, metal complexors, antioxidants, wetting agents, polymer stabilizers, clay stabilizers, scale dissolvers, wax inhibitors, wax dissolvers, asphaltene precipitation inhibitors, waterflow inhibitors, sand consolidation chemicals, permeability modifiers, foaming agents, microorganisms, nutrients for microorganisms, fine migration control agents, zeolites, clays, inorganic flakes, ceramics, cement, activated carbon, surfactants, paraffin inhibitors, oxygen scavengers, amines, pH buffers, friction reducers, clay inhibitors, production chemicals, diverting agents, diverting agents and salts thereof and combinations thereof.

5. The method of claim 4 where a fluid loss control agent is present at a concentration effective to improve the fluid loss of the aqueous viscoelastic treating fluid as compared with an identical fluid absent the fluid loss control agent, where the fluid loss control agent is selected from the group consisting of alkaline earth metal oxides, alkaline earth metal hydroxides, transition metal oxides, transition metal hydroxides, and mixtures thereof.

6. The method of claim 5 where in the fluid loss control agent, the alkaline earth metal oxide or hydroxide is selected from the group consisting of oxides or hydroxides of magnesium, calcium, strontium, barium and mixtures thereof, and the transition metal oxide or hydroxide is selected from the group consisting of oxides or hydroxides of aluminum, zirconium, vanadium, molybdenum, manganese, iron, cobalt, nickel, palladium, copper, zinc, tin, antimony, titanium and combinations thereof.

7. The method of claim 5 where the effective concentration of the fluid loss control agent ranges from about 2 to about 200 pptg (about 0.2 to about 24 kg/m$^3$) based on the aqueous viscoelastic treating fluid.

8. The method of claim 1 where the agent is a solid and has a size ranging from about 1 nanometer to about 10 millimeters.

9. The method of claim 1 where the agent is a liquid.

10. The method of claim 1 where for a period of time during the method the fluid is exposed to a temperature of from about 70° F. to about 400° F. (about 21 to about 204° C.).

11. A method for delayed treating of a subterranean formation with an agent comprising:
injecting an aqueous viscoelastic surfactant treating fluid through a wellbore and to the subterranean formation at a predetermined location within a reservoir, where the aqueous viscoelastic treating fluid comprises:
a brine base fluid;
a viscoelastic surfactant (VES) gelling agent in an amount effective to form a VES gel that increases the viscosity of the aqueous viscoelastic surfactant treating fluid;
at least one internal breaker within the VES gel, where the internal breaker is selected from the group consisting of mineral oils, fish oils, hydrogenated polyalphaolefin oils, transition metal ion sources, reducing agent sources, chelating agent sources, alkali metal sources, alkaline earth metal sources, saponified fatty acids, unsaturated or saturated fatty acids, and combinations thereof; and
an agent within the VES gel, where the agent is a solid and has a size ranging from about 1 nanometer to about 10 millimeters;
breaking the VES gel with the internal breaker thereby reducing the viscosity of the aqueous viscoelastic surfactant treating fluid; and thereby releasing the agent from the VES gel into the predetermined location in the subterranean formation at a predetermined time after the injecting.

12. The method of claim 11 where the agent is selected from the group consisting of fluid loss control agents, enzyme polymer breakers, oxidative polymer breakers, polymer breaker enhancers, microencapsulated chemicals, macroencapsulated chemicals, nanoencapsulated chemicals, scale inhibitors, gas hydrate inhibitors, stimulation chemicals, remedial cleanup agents, water-block removal agents, crosslinkers, polymers, biocides, corrosion inhibitors, corrosion dissolvers, pH modifiers, metal chelators, metal complexors, antioxidants, wetting agents, polymer stabilizers, clay stabilizers, scale dissolvers, wax inhibitors, wax dissolvers, asphaltene precipitation inhibitors, waterflow inhibitors, sand consolidation chemicals, permeability modifiers, foaming agents, nutrients for microorganisms, fine migration control agents, zeolites, clays, inorganic flakes, ceramics, cement, activated carbon, surfactants, paraffin inhibitors, oxygen scavengers, amines, pH buffers, friction reducers, clay inhibitors, production chemicals, diverting agents, diverting agents and salts thereof and combinations thereof.

13. A method for delayed treating of a subterranean formation with an agent comprising:
injecting an aqueous viscoelastic surfactant treating fluid through a wellbore and to the subterranean formation at a predetermined location within a reservoir, where the aqueous viscoelastic treating fluid comprises:
a brine base fluid;
a viscoelastic surfactant (VES) gelling agent in an amount effective to form a VES gel that increases the viscosity of the aqueous viscoelastic surfactant treating fluid;
at least one internal breaker within the VES gel, where the internal breaker is selected from the group consisting of mineral oils, fish oils, hydrogenated polyalphaolefin oils, transition metal ion sources, reducing agent sources, chelating agent sources, alkali metal sources, alkaline earth metal sources, saponified fatty acids, unsaturated or saturated fatty acids, and combinations thereof;
an agent within the VES gel, where the agent is a solid and has a size ranging from about 1 nanometer to about 10 millimeters, and where the agent is selected from the group consisting of fluid loss control agents, microencapsulated chemicals, macroencapsulated chemicals, nanoencapsulated chemicals, scale inhibitors, gas hydrate inhibitors, stimulation chemicals, remedial cleanup agents, water-block removal agents, crosslinkers, polymers, biocides, corrosion inhibitors, corrosion dissolvers, pH modifiers, metal chelators, metal complexors, antioxidants, wetting agents, polymer stabilizers, clay stabilizers, scale dissolvers, wax inhibitors, wax dissolvers, asphaltene precipitation inhibitors, waterflow inhibitors, sand consolidation chemicals, permeability modifiers, foaming agents, nutrients for microorganisms, fine migration control agents, zeolites, clays, inorganic flakes, ceramics, cement, activated carbon, surfactants, paraffin inhibitors, oxygen scavengers, amines, pH buffers, friction reducers, clay inhibitors, production chemicals, diverting agents, diverting agents and salts thereof and combinations thereof; and one or more components selected from the group consisting of a temperature stabilizer, a viscosity stabilizer, viscosity enhancer, and combinations thereof; and breaking the VES gel with the internal breaker thereby reducing the viscosity of the aqueous viscoelastic surfactant treating fluid; and thereby releasing the agent from the VES gel into the predetermined location in the subterranean formation at a predetermined time after the injecting;

where for a period of time during the method the fluid is exposed to a temperature of from about 70° F. to about 400° F. (about 21 to about 204° C.).

* * * * *